Figure 4:
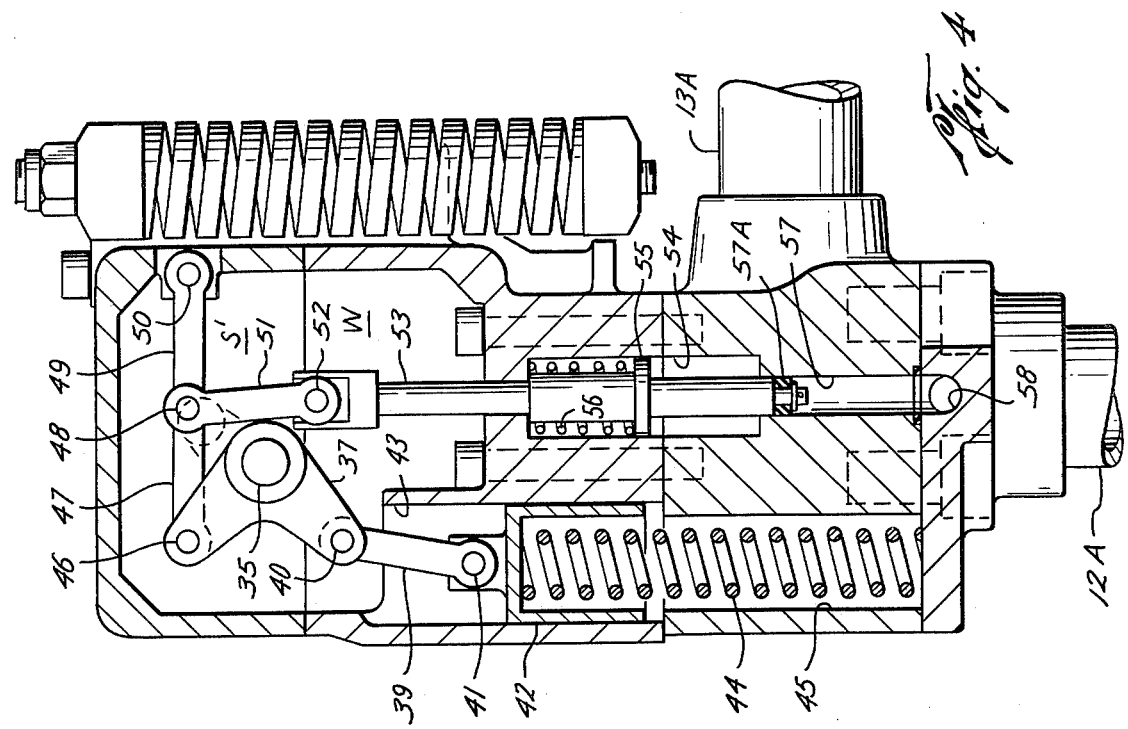

United States Patent [19]

Troxell, Jr.

[11] 4,201,242

[45] May 6, 1980

[54] PRESSURE RELIEF VALVE

[75] Inventor: John N. Troxell, Jr., Houston, Tex.

[73] Assignee: Cameron Iron Works, Inc., Houston, Tex.

[21] Appl. No.: 914,997

[22] Filed: Jun. 13, 1978

[51] Int. Cl.² ............................................. F16K 15/00
[52] U.S. Cl. .................................... 137/531; 137/530; 251/337
[58] Field of Search ....................... 137/529, 530, 531; 251/337

[56] References Cited

U.S. PATENT DOCUMENTS

| 58,962 | 10/1866 | Naylor | 137/531 |
| 306,568 | 10/1884 | Wilder | 137/531 |
| 2,322,195 | 6/1943 | Mock | 251/337 X |
| 3,675,679 | 7/1972 | Schwartz | 137/529 X |

*Primary Examiner*—Harold W. Weakley
*Attorney, Agent, or Firm*—Marvin B. Eickenroht; Jennings B. Thompson

[57] ABSTRACT

There is disclosed a pressure relief valve having a part which is movable to a first position for returning the closure member thereof to closed position, and thus resetting the valve, automatically in response to a predetermined low pressure level of fluid within the flowway, and to a second position which permits the closure member to move to open position automatically in response to a pressure level of the fluid to be contained which is less than that at which the valve is set to open.

8 Claims, 6 Drawing Figures

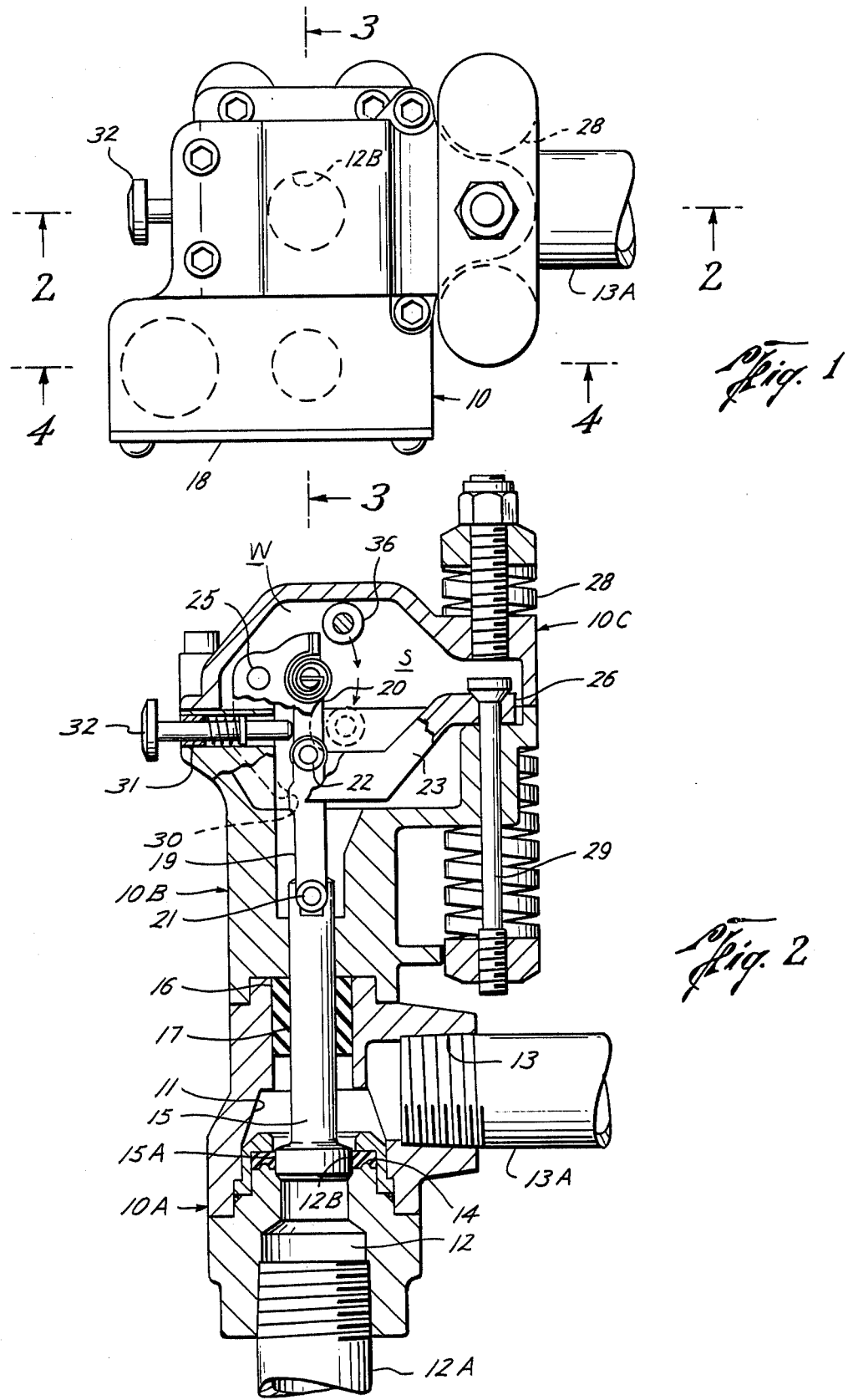

PRESSURE RELIEF VALVE

This invention relates generally to pressure relief valves; and, more particularly, to improvements in valves of this type in which the closure element, upon movement to open position to relieve pressure, is automatically returned to closed or reset position.

Kinzback U.S. Pat. No. 2,655,935 shows a valve of this general type wherein the closure element is held in its closed or set position by means of a series of coil springs which are so arranged as to resist opening or pressure relieving movement of the closure element with a force which decreases as the closure element moves toward open position. In this manner, once the closure element is unseated to open the inlet in which the pressure to be relieved is contained, it is permitted to continue to move quickly to a fully open position, and thus not chatter, despite the sudden drop in fluid pressure within the valve due to unseating of the closure element. Then, when the pressure within the valve drops to a predetermined low, the springs are effective to return the closure element to closed or set position with an increasing force which insures quick and full seating, despite the increase in pressure within the valve as the closure elements move toward seated position.

One problem with the above-described valve is that the springs which resist relieving of the pressure also supply the force to reset the closure member. Thus, there is no way to reset in response to a predetermined low fluid pressure in the valve which is independent of the pressure at which the valve is designed to relieve. Among other things, this necessarily delays the closing or resetting movement of the closure element.

Troxell U.S. Pat. No. 2,973,777 shows a pressure relief valve wherein an arm which is pivotally mounted on the body of the valve for swinging in opposite directions, and which is urged in one of said directions by coil springs, is connected to the closure member by a pair of pivotally connected links, and a part on the arm locates the links in a position with the axis of the pivotal connection therebetween to one side of an imaginary straight line through the axes of their connections to the arm and valve member. Thus, the links transmit a force from the arm to the closure member due to the coil springs which is effective to prevent movement of the closure member away from its seat and in an opening direction until the pressure of the fluid within the flowway reaches a predetermined value.

The arm is responsive to initial opening movement of the valve member to overcome the force of the springs and cause the part thereon to move the links back over center into another position in which their pivotal connection is disposed on the other side of the imaginary straight line. This permits the links to collapse and thus renders them ineffective to transmit force from said arm to said closure element, upon continued movement thereof in an opening direction, so that the closure element is free to move quickly to a fully opened position. At the same time, collapsing of the links permits the springs to return the arm and the link engaging part thereon to positions in which the latter is adapted to relocate the links in said first-mentioned position, so that the valve may be reset merely upon such return of the links to their over center position.

A torsion spring is connected to one of the links as to normally urge the links to their over center, set position. In addition to maintaining the links in this position, regardless of the orientation of the valve, this spring is intended to automatically return the links from collapsed to set position, once the valve has been relieved, in response to a predetermined drop in pressure within the valve. As a practical matter, however, the spring is so arranged that the force it provides to oppose opening of the closure member will increase as the member moves in an opening direction, and thus it must be of limited size in order not to interfere with the pressure at which the valve is designed to relieve. Consequently, its use in resetting the valve is of limited value.

The primary object of the present invention is to provide a pressure relief valve of the general type above described wherein the means by which the valve is automatically reset is independent of the means by which the closure member is normally held in its closed position, thereby permitting the force provided for performing each function to be adjusted or varied independently of the other.

Another object is to provide such a valve in which the means by which the closure member may be automatically reset is separated from the remainder of the valve, and not only to permit replacement and repair of its parts, without loss of line pressure, but also to contain its parts so as to prevent injury to personnel in and around the valve.

Another object is to provide such a valve which is of relatively inexpensive and simple construction.

Still another object is to provide a mechanism which is especially well suited for automatically resetting the closure member of the valve of the type shown in the aforementioned Troxell U.S. Pat. No. 2,973,777, and thus in returning the linkage of such a valve from a collapsed to a reset position.

These and other objects are accomplished, in accordance with the illustrated embodiment of the present invention, by a valve which is similar to those above described in that it comprises a body having a flowway therein with an inlet to and an outlet from the flowway, and a closure member which is movable within the flowway between positions opening and closing the inlet and which has a pressure responsive surface exposed to fluid within the inlet in the closed position thereof for urging the closure member to its open position. More particularly, a means is provided for holding the closure member in closed position until fluid within the inlet reaches a predetermined pressure level and then releasing such closure member for movement to open position. As compared with prior valves of this type, however, a reset part is mounted on the body for movement between a first position which permits the valve member to move to open position, and a second position which moves the closure member from open to closed position, and a means is also provided for moving such part to its first position in response to fluid pressure within the inlet which is less than the predetermined level required to open the closure member, whereby the closure member is free to be moved to open position upon release, and for moving such part to such second position, in order to return the closure member to closed position, in response to a predetermined low pressure of fluid within the inlet.

In the illustrated and preferred embodiment of the invention, the means for so moving this part between its first and second positions includes a passageway in the valve body connecting with the flowway thereof, a piston sealably slidable in the passageway so as to be urged in one direction by fluid pressure in the flowway.

The piston is connected to such part so as to move the part to its first position, upon movement of the piston in one direction, and a means is provided for yieldably urging said piston in the opposite direction.

More particularly, a shaft extends through and is rotatably mounted on a dividing wall of the body, with the aforementioned means for moving the reset part being connected to the shaft on one side of the wall for rotating it in opposite rotational directions, and the reset part comprises an arm mounted on the shaft on the other side of the wall for swinging between a first position which permits the closure member to move to opened position, and a second position which moves the closure member to closed position upon rotation of the shaft in the opposite direction.

As illustrated, a means is provided for movement between a first position holding the yieldable urging means in a compressed position, whereby the reset arm may be maintained in its first position, and a second position releasing the urging means to move said arm to its second position. More particularly, additional means is provided for moving the holding and releasing means from its second to its first position, in response to movement of the piston in one direction due to fluid pressure within the inlet, which is less than the predetermined level required to operate the closure member, and for moving the holding and releasing means from its first to its second position in order to return the closure member to closed position, in response to movement of the piston in the opposite direction due to a predetermined low pressure of fluid within the flowway.

In the preferred and illustrated embodiment of the invention, a crank arm is connected to the aforementioned shaft for rotation with it, and a means pivotally connects the yieldable urging means to one arm of the crank to urge it to rotate in one direction.

As illustrated, the means for yieldably urging the crank arm to such one position comprises a coil spring carried within the body for expansion and contraction along a fixed axis, connected to one end of the crank arm by a link pivotally connecting a cap on one end of the spring with the one end of the crank arm. A pair of links are pivotally connected to one another and to the other arm of the crank and to the body of the valve, so that, when the pivotal axes of the links may be moved into aligned position to hold the reset arm in its first position, and a means is provided for yieldably urging the piston in the opposite direction, and thus to move the axes of the links out of aligned position in order to release the crank arm for rotation in response to the coil spring. Thus, the crank is urged by the coil spring in a direction to reset the closure member, and, upon movement of the piston in said one direction, the crank is rotated in the opposite direction to its position for holding the crank arm in a position in which the closure member may move to open position.

Figure 3:
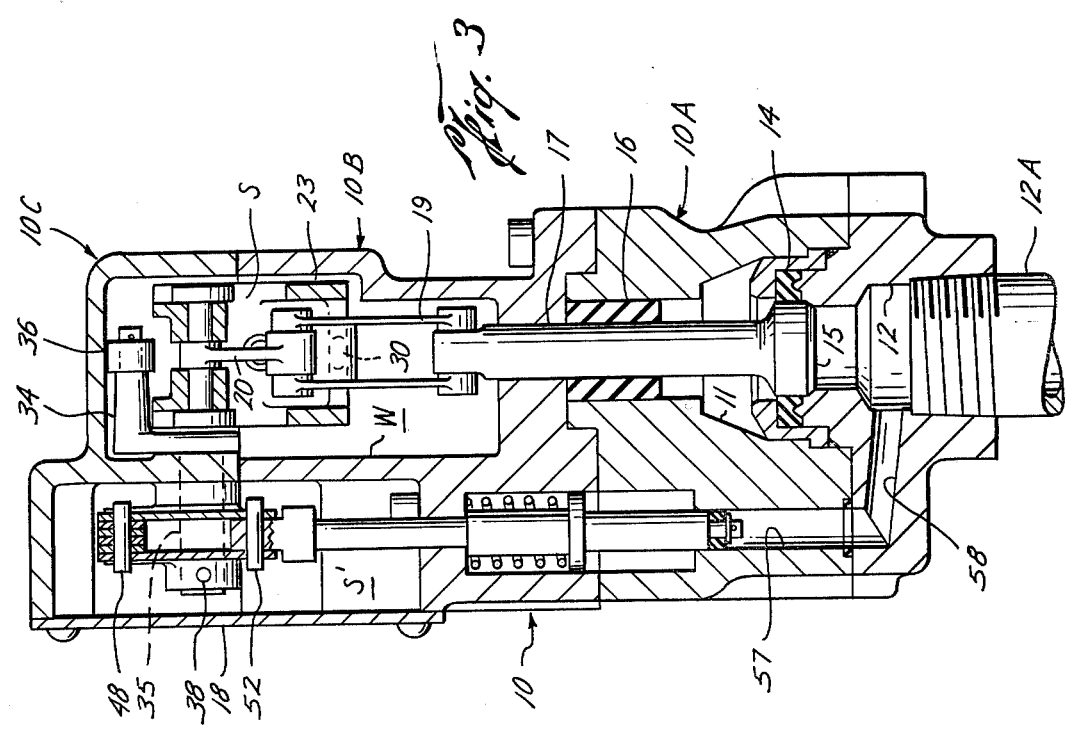
Figure 6:
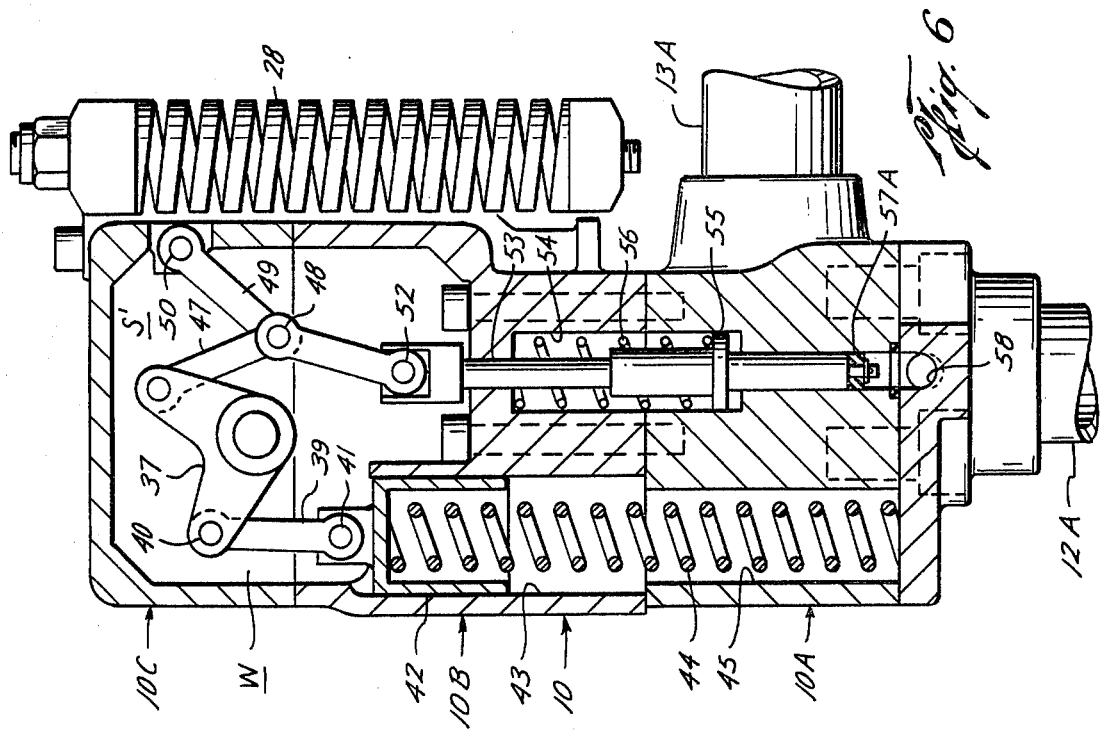
Figure 5:
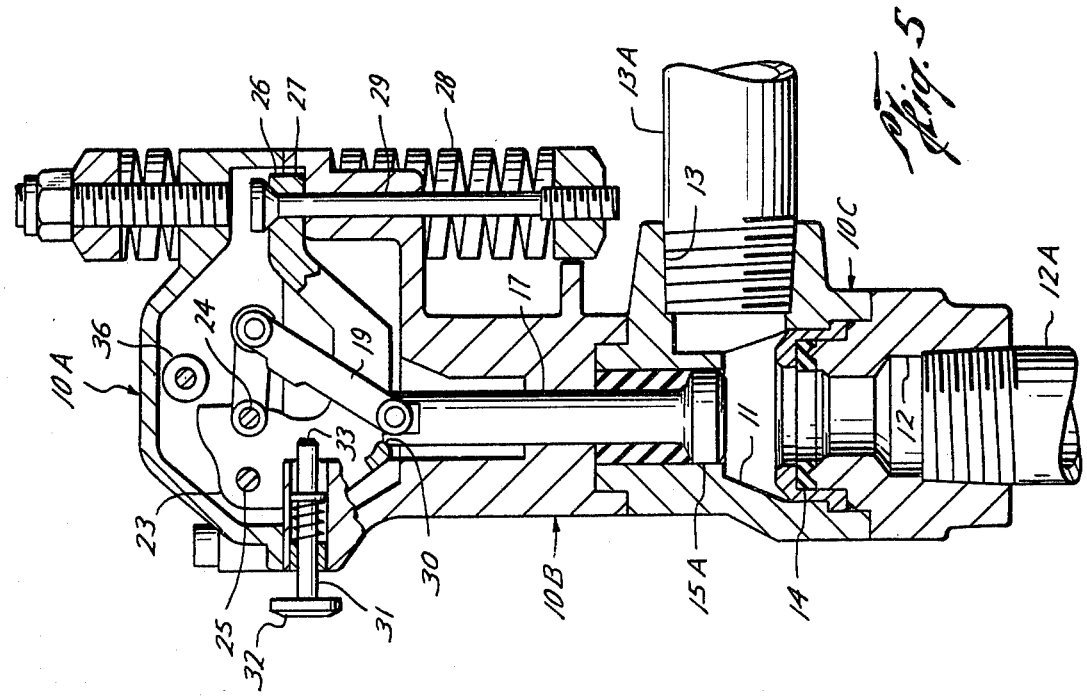

In the drawings, wherein like reference characters are used throughout to designate like parts:

FIG. 1 is a top plan view of a pressure relief valve constructed in accordance with the present invention;

FIG. 2 is a vertical sectional view of the valve of FIG. 1, as seen along broken lines 2—2 thereof, with the closure element of the valve shown in its closed position, and the automatic reset arm shown in solid lines in its position for permitting the closure member to move to pressure relieving position, and in broken lines in the position to which it is moved in order to return the closure member to the reset position of FIG. 2;

FIGS. 3 and 4 are further vertical sectional views of the valve, as seen along broken lines 3—3 and 4—4, respectively, of FIG. 1, with the closure member of the valve being shown in its closed position in FIG. 3 and the piston of the reset mechanism being shown in FIG. 4 raised to a position by pressure within the inlet to the valve body for moving the reset arm to the solid line position of FIG. 2;

FIG. 5 is a vertical sectional view of the valve, similar to that of FIG. 2, but with the closure member moved to pressure relieving position; and FIG. 6 is a vertical sectional view of the valve, similar to that of FIG. 4, but with the crank arm rotated in a clockwise direction, in response to expansion of the coil spring urging it in such direction, for swinging the reset arm to the broken line position of FIG. 2.

With reference now to the details of the above-described drawings, the overall body of the valve, which is indicated in its entirety by reference character 10, is shown to comprise a lower section 10A, an intermediate section 10B and an upper section 10C. The lower section 10A has a flowway 11 formed therein with an inlet 12 to the flowway and an outlet 13 therefrom formed at a right angle to the inlet, a pipe 12A connecting with the inlet and a pipe 13A connecting with the outlet. A seal ring 14 is carried by the lower body section 10A adjacent a reduced diameter portion 12B at the upper end of flowway 12 to form a seal with the lower cylindrical end 15A of a closure member 15. Thus, the closure member is vertically shiftable within the flowway between the closed position of FIGS. 2 and 3, wherein the lower cylindrical end 15A of the closure member fits within the seal ring 14, and the open position of FIG. 5, wherein the lower end of the closure member is withdrawn from the inlet 12 into a recess above the flowway and beneath a sleeve 16 sealing about a stem 17 of the closure member. As shown, in its upper, open position, the closure member is removed from the flowway to permit unobstructed flow from the inlet 12 to the outlet 13 of the valve body.

When closed, the closure member is urged by fluid pressure within the inlet 12 to its upper, open position. The force which urges the closure member open is opposed by a means which, as previously described, is similar in construction and function to that shown and described in Troxell U.S. Pat. No. 2,973,777. Thus, as described in the earlier patent, and as will be apparent from the description to follow, this means maintains the closure member in its closed position with a force which decreases as the closure member moves upwardly, thereby enabling the closure member to move quickly into the fully open position of FIG. 5, despite the sudden drop in pressure of fluid within the inlet 12, as soon as its lower end moves out of sealing engagement with seal ring 14.

The upper end of the stem 17 of the closure member extends through the sleeve 16 and the lower end of the intermediate body section 10B into an open space S formed between the outer and intermediate walls of the intermediate and upper body sections 10B and 10C. As will be described more fully below, the intermediate wall W separates the space S from another space S' formed within the intermediate and upper body sections between the intermediate wall and the other outer wall of the body which includes a removable cover plate 18.

The upper end of stem 17 is connected to a pair of links 19 and 20 disposed within the space S, the lower link 19 having its lower end connected to the stem by means of a pin 21, and its upper end connected to the lower end of upper link 20 by means of pin 22, and the upper end of the upper link 20 having its upper end connected to an arm 23 by means of a pin 24. As shown in FIGS. 2 and 3, the arm 23, which is also received within the space S, is of bifurcated construction and straddles the links 19 and 20 and is pivotally mounted on a pin 25 whose opposite ends are mounted in the side walls of the upper body section 10C. Thus, the arm may swing about the axis of the pin 25 as the links 19 and 20 move between the relatively aligned position of FIG. 2 and the collapsed position of FIG. 5. Arm 23 has an extension 26 which is urged into engagement with a shoulder 27 on the intermediate valve body 10B by means of a pair of coil springs 28 mounted on the valve body and bearing downwardly on a rod 29 having a head on its end which engages the extension. Movement of the links 19 and 20 into the position of FIG. 2 forces the closure member into the closed position of FIG. 2 and thus resets the valve. In this position, the axis of the connecting pin 22 is disposed just to the left or over center from an imaginary line through the axes of pins 21 and 24. The links are held in this offcenter position by means of a bar 30 extending between the bifurcated sections of arm 23 when the arm extension 26 is engaged with shoulder 27.

As more fully described in the aforementioned Troxell patent, as fluid pressure within the inlet reaches a predetermined level, the enlarged lower end of the closure member is moved upwardly and out of the seal ring 14. This upward movement is transmitted by the links to the arm 23 to cause it to swing in a counterclockwise direction against the downwardly acting force of the coil springs 28. This swinging of the arm will, through the bar 30, in turn urge the link 19 in a clockwise direction and thus move the axis of the pin 22 over dead center, in response to which the links 19 and 20 quickly collapse into the position of FIG. 5 to permit the closure member to move rapidly and fully upwardly into the position of FIG. 5. At the same time, this collapsing of the links relieves the force exerted on arm 23 through the rod 29, and thus permits the arm to be moved back to the position shown in FIG. 5 under the urging of coil springs 28.

In order to permit the valve to be tripped manually, a rod 31 is mounted on and extends through the end wall of the intermediate body section 10B to dispose its inner end 33 adjacent the left side of link 20 above pin 22. The rod has a head 32 on its outer end which may be pushed inwardly to move link 20 in a counterclockwise direction, and thus cause the links to move over dead center.

The mechanism for automatically resetting the valve—i.e., moving the links from the collapsed position of FIG. 5 back to the over-center position of FIG. 2 in order to move the closure member from the open position to the closed position—includes an arm 34 disposed within space S and mounted on and fixed to a shaft 35 extending through and journaled within the intermediate wall W of the upper body section 10C. More particularly, the arm has a roller 36 on its outer end which swings between the solid line position of FIG. 2 to the broken line position of the same Figure in response to rotation of shaft 35. Thus, for example, upon rotation of the shaft in a counterclockwise direction, the roller 36 on the end of arm 34 may be swung upwardly to the solid line position of FIG. 2, which is out of the way of the links 19 and 20, and thus permits them to move from the off center position of FIG. 2 to the collapsed position of FIG. 5. However, rotation of the shaft in the opposite direction—i.e., in a clockwise direction as seen in FIG. 2—the roller 36 is moved downwardly to force the links back into the off center position as the roller moves into the dotted line position of FIG. 2, thereby returning the valve member from the open position of FIG. 5 to the closed position of FIG. 2, and thus resetting the valve.

As shown in FIGS. 4 and 6, a crank arm 37 is connected to the other end of shaft 35 (FIG. 3), for rotation with it within the space S' of the valve body. One end of crank arm 37 is pivotally connected to a link 39 by means of a pivot pin 40, and the other end of link 39 is in turn connected by a pivot pin 41 to a cap 42 slidable within a guideway 43 formed in the intermediate body section 10B. The cap, and thus the link 39, is yieldably urged upwardly by means of a coil spring 44 which is held in a compressed state between the cap and the lower end of a reduced diameter cylindrical guideway 45 formed in the lower body section 10A. As will be appreciated, this upward urging of the link 39 will in turn act through the pin 40 so as to urge the crank arm in a clockwise direction, as seen in FIGS. 4 and 6.

The opposite end of the crank arm 37 is connected by pivot pin 46 to a link 47, and link 47 is in turn pivotally connected by means of pin 48 to a link 49 having its opposite end pivotally connected to the valve body by means of a pin 50. Thus, as will be understood from FIGS. 4 and 6, movement of the links 47 and 49 from the collapsed position of FIG. 6 to the aligned position of FIG. 4 will swing the crank arm 37 in a counterclockwise direction and hold it in such position in opposition to the force of the coil spring 44. On the other hand, movement of the axis of pin 48 downwardly out of alignment with an imaginary line through the axes of pins 46 and 50 releases the upward thrust due to coil spring 44 to permit it to urge the links to the collapsed position of FIG. 6.

Relating this then to the reset arm 34, swinging of the crank arm and thus the shaft 35 in a counterclockwise direction will move the roller 36 to the out-of-the-way position shown in solid lines in FIG. 2, while swinging of the crank arm and thus the shaft 35 in a clockwise direction, from the position of FIG. 4 to the position of FIG. 6, will swing the crank arm downwardly in a clockwise direction, as seen in FIG. 2, and thus to its broken line position so as to return the links from the collapsed position to the over center position in order to reset the valve.

A third link 51 is connected to the links 47 and 49 by means of the pivot pin 48, and the lower end of link 51 is in turn connected by pivot pin 52 to the upper end of a rod 53 which extends downwardly through a horizontally disposed wall within intermediate body section 10B and into a guideway 54 having its upper end formed in the body section 10B and its lower end formed in body section 10A. Rod 53 is guided for vertical reciprocation in the guideway 54 by means of a flange 55 thereon, and the flange and thus the rod and link 51 are urged in a downward direction by means of a coil spring 56 surrounding the rod between the upper end of the guideway and the top side of guide flange 55.

The lowermost end of the rod 53 extends downwardly through the guideway 54 and into a reduced diameter cylinder 57, and a seal ring 57A is carried on the lower end of the rod to form a piston sealably slidable within the cylinder. As shown in FIG. 3, the lower end of the cylinder 57 connects with a laterally extending passageway 58 leading into inlet 12 beneath the lower end of the seal ring 14 in which the lower end of the closure member 15 is disposed in the set position of the valve. Thus, when the valve is set, fluid pressure within the inlet 12 acts not only with the lower end of the closure member, but also over the piston. The upwardly directed force on the piston is transmitted through the rod 53 and link 51 to urge the links 47 and 49 to the aligned position of FIG. 4. As previously described, in this position, links 47 and 49 hold the crank arm 37 in the position shown in FIG. 4, and thus maintain the coil spring 44 collapsed and the shaft 35 rotated in a direction to move the roller 36 on the end of the reset arm to the solid line position of FIG. 2.

The piston is of such size, and the spring 56 has a force, which will enable the piston and thus the rod 53 to be moved upwardly to the position of FIG. 4 in response to a fluid pressure in the inlet 12 less than that required to raise the closure member from its closed position. This then insures that the reset arm will be moved out of the way of the links prior to their collapsing from the position of FIG. 2 to that of FIG. 5. On the other hand, if the fluid pressure within the inlet 12 is even lower than that required to move the piston upwardly to the position of FIG. 4, such that the piston instead occupies the lower position of FIG. 6, wherein the reset arm is swung downwardly to the reset position shown in broken lines in FIG. 2, no harm is done inasmuch as the closure member will not move to its open position at such a pressure.

Of course, once the closure member has opened and moved from its FIG. 3 to its FIG. 5 position, the drop in pressure of fluid within the inlet will permit the piston to move downwardly, and thus the links 47 and 49 to be forced by coil spring 44 from the position of FIG. 4 to the position of FIG. 6. As a result, and as previously described, the links 19 and 21 are returned from the collapsed position of FIG. 2 to the over center position of FIG. 2 in order to return the closure member from its FIG. 5 to its FIG. 2 position in order to reset the valve.

It should be noted in this regard that the resistance provided by the links 47 and 49 to rotation of the crank arm in a direction to reset the valve decreases rapidly as the piston moves downwardly. That is, just as soon as the axis of the pin 48 moves below an imaginary line to the axis of the pins 46 and 50, the links release the crank arm to be rotated by spring 44 as the force by which the crank arm was held in the position of FIG. 4 decreases at an ever increasing rate, thus permitting the reset arm to move rapidly and fully to the broken line position of FIG. 2 to insure full closing of the closure member.

It will also be noted that as the links 47 and 49 move from the FIG. 4 to the FIG. 6 position, the link 39 will move from a position in which it is substantially aligned with the adjacent end of crank arm 37 to one in which it is substantially perpendicular thereto, thus providing a mechanical advantage which increases the force of the coil spring 44 which urges the crank arm in a clockwise direction.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A pressure relief valve, comprising a body having a flowway therein with an inlet to and an outlet from the flowway, a closure member movable within the flowway between positions opening and closing the inlet and having a pressure responsive surface exposed to fluid within the inlet in the closed position thereof for urging the closure member to its open position, means for holding said closure member in closed position until fluid within the inlet reaches a predetermined pressure level and then releasing said closure member for movement to open position, additional means for automatically returning the closure member to closed position independently of the holding means, including a part mounted on the body for movement between a first position which permits the closure member to move to open position and a second position which moves the closure member from open to closed position, and means for moving said part to its first position in response to fluid pressure within the inlet which is less than the predetermined level required to open the closure member, and for moving said part to its second position, in response to a predetermined low pressure level of fluid within the flowway.

2. A pressure relief valve of the character defined in claim 1, wherein
the means for moving said part includes a passageway in the body connecting with the flowway thereof,
a piston sealably slidable in the passageway so as to be urged in one direction by fluid pressure in the flowway,
means connecting the piston to said part so as to move said part to its first position upon movement of the piston in said one direction, and
means yieldably urging said piston in the opposite direction.

3. A pressure relief valve of the character defined in claim 1, wherein said means for holding the closure member in closed position comprises an arm pivotally mounted on the body for swinging in opposite directions, means yieldably urging the arm in one of said directions, a pair of links pivotally connected to one another and to the arm and closure member, and means for locating the links in a first position in which the axis of the pivotal connection between them is to one side of an imaginary straight line through the axis of their pivotal connections with the arm and the closure member so as to transmit a force from the urging means to the closure member which is effective to prevent opening movement of the closure member, until the pressure fluid within the inlet reaches a predetermined level, and moving said links to a second position in which the axis of said pivotal connection between them is disposed on the other side of said line, in response to initial opening movement of the closure member, so as to render said links ineffective to transmit force from the urging means to the closure member upon continuing opening movement thereof, and said additional means for returning the closure member to its closed position, comprises a shaft rotatably mounted on the body, said part comprising an arm mounted on the shaft for swinging between a first position which permits the closure member to move to open position, upon rotation of the shaft in one direction, and a second position to move the links from the second to the first position, in order to move the closure member to closed position, upon rotation of the shaft in the opposite direction, and means connecting the moving means to said shaft in order to rotate it in a direction to swing said arm to the first position, and to rotate it in the opposite direction to swing said arm to the second position.

4. A pressure relief valve, comprising
a body having a flowway therein with an inlet to and an outlet from the flowway,
a closure member movable within the flowway between positions opening and closing the inlet and having a pressure responsive surface exposed to fluid within the inlet in the closed position thereof for urging the closure member to its open position,
means for holding said closure member in closed position until fluid within the inlet reaches a predetermined pressure level and then releasing said closure member for movement to open position,
a part mounted on the body for movement between a first position which permits the closure member to move to open position and a second position to move the closure member to closed position,
a piston sealably slidable in the passageway so as to be urged in one direction by fluid pressure in the flowway,
means connecting the piston to said part so as to move said part to its first position upon movement of the piston in said one direction,
means yieldably urging said part to its second position,
means engageable with said urging means and movable between a first position holding said part in its first position, and a second position releasing said part for movement to its second position, and
means for moving said holding and releasing means from its second to its first position, in response to urging of said piston in said one direction, and from its first to its second position in order to return the closure member to closed position in response to movement of the piston in the opposite direction.

5. A pressure relief valve of the character defined in claim 4, wherein
said holding and releasing means comprises
a shaft connected to said part and rotatably mounted on the body,
a crank arm connected to the shaft for rotation therewith,
means pivotally connecting the yieldable urging means to one end of the crank arm to urge the shaft to rotate in one direction, and
a pair of links pivotally connected to one another and to the other end of the crank arm and the body so as to rotate the shaft in said one direction, upon movement of the piston in said opposite direction to permit said closure member to be moved by said part to closed position, and, upon movement of the piston in said one direction, to rotate the shaft in said opposite direction to permit said closure member to be moved to open position.

6. A pressure relief valve of the character defined in claim 5, wherein
the pivotal axes of the links are aligned when said part is in its first position, and
a means is provided for yieldably urging said piston in said opposite direction.

7. A pressure relief valve of the character defined in claim 5, wherein
said yieldable urging means comprises a coil spring carried within the body for expansion and contraction along a fixed axis, and
a cap engaging one end of the spring and guidably slidable in the body, and
said connecting means comprises a link pivotally connected to the cap and said one end of the crank arm.

8. A pressure relief valve of the character defined in claim 4, wherein said means for holding the closure member in closed position comprises an arm pivotally mounted on the body for swinging in opposite directions, means yieldably urging the arm in one of said directions, a pair of links pivotally connected to one another and to the arm and closure member, and means for locating the links in a first position in which the axis of the pivotal connection between them is to one side of an imaginary straight line through the axis of their pivotal connections with the arm and the closure member so as to transmit a force from the urging means to the closure member which is effective to prevent opening movement of the closure member, until the pressure fluid within the inlet reaches a predetermined level, and moving said links to a second position in which the axis of said pivotal connection between them is disposed on the other side of said line, in response to initial opening movement of the closure member, so as to render said links ineffective to transmit force from the urging means to the closure member upon continuing opening movement thereof, said part comprises an arm mounted on the shaft for swinging between a first position which permits the closure member to move to open position, upon rotation of the shaft in one direction, and a second position to move the links from the second to the first position in order to move the closure member to closed position, upon rotation of the shaft in the opposite direction, and means connects the moving means to said shaft in order to rotate it in a direction to swing said arm to the first position, and to rotate it in the opposite direction to swing said arm to the second position.

* * * * *